United States Patent
Vauchel et al.

(10) Patent No.: US 8,769,926 B2
(45) Date of Patent: Jul. 8, 2014

(54) THRUST REVERSER HAVING AN AERODYNAMIC COUPLING FOR A FRONT FRAME

(71) Applicant: Aircelle, Gonfreville l'Orcher (FR)

(72) Inventors: Guy Bernard Vauchel, Harfleur (FR); Jean-Philippe Joret, Beuzeville (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/735,096

(22) Filed: Jan. 7, 2013

(65) Prior Publication Data

US 2013/0126638 A1 May 23, 2013

Related U.S. Application Data

(63) Continuation of application No. PCT/FR2011/051388, filed on Jun. 17, 2011.

(30) Foreign Application Priority Data

Jul. 7, 2010 (FR) ..................................... 10 55498

(51) Int. Cl.
*F02K 1/72* (2006.01)
(52) U.S. Cl.
USPC .... 60/230; 60/226.2; 244/110 B; 239/265.19; 239/265.29
(58) Field of Classification Search
CPC ................ F02K 7/72; F02K 1/80; F02K 1/72
USPC .................. 60/226.2, 226.3, 230; 244/110 B; 239/265.19, 265.29, 265.11
See application file for complete search history.

(56) References Cited

U.S. PATENT DOCUMENTS

| | | | | |
|---|---|---|---|---|
| 4,185,798 A | | 1/1980 | Dickenson | |
| 4,581,890 A | * | 4/1986 | Giraud | 60/230 |
| 5,239,822 A | * | 8/1993 | Buchacher | 60/226.2 |
| 5,806,302 A | * | 9/1998 | Cariola et al. | 60/204 |
| 5,967,460 A | * | 10/1999 | Baudu et al. | 244/110 B |
| 6,000,216 A | * | 12/1999 | Vauchel | 60/226.2 |
| 6,385,964 B2 | * | 5/2002 | Jean et al. | 60/226.2 |
| 2010/0229526 A1 | * | 9/2010 | Germain et al. | 60/226.1 |
| 2011/0174899 A1 | * | 7/2011 | Vauchel | 239/265.11 |

FOREIGN PATENT DOCUMENTS

FR 2936222 3/2010

OTHER PUBLICATIONS

PCT/FR2011/051388 International Search Report.

* cited by examiner

*Primary Examiner* — William H Rodriguez
*Assistant Examiner* — Carlos A Rivera
(74) *Attorney, Agent, or Firm* — Brinks Gilson & Lione

(57) ABSTRACT

A thrust reversal device for a turbojet engine nacelle is provided that includes a deflection means and at least one cowl moveable relative to at least one fixed structure including at least one at least partly peripheral front frame and equipped with means for connection to a corresponding upstream portion. The front frame has a deflection edge having an upstream extension forming a deformable flap intended to become an aerodynamic interface with the corresponding upstream portion to which is attached the front frame, and in that a portion of the moveable cowl is conformed so as to, in the closing position, interface with said upstream attachment portion by forcing withdrawal of the deformable flap.

12 Claims, 3 Drawing Sheets

THRUST REVERSER HAVING AN AERODYNAMIC COUPLING FOR A FRONT FRAME

CROSS-REFERENCE TO RELATED APPLICATIONS

This application is a continuation of International Application No. PCT/FR2011/051388 filed on Jun. 17, 2011, which claims the benefit of FR 10/55498, filed on Jul. 7, 2010. The disclosures of the above applications are incorporated herein by reference.

FIELD

The present disclosure relates to a turbojet engine nacelle having a downstream section equipped with a thrust reversal device mounted on a front frame.

BACKGROUND

The statements in this section merely provide background information related to the present disclosure and may not constitute prior art.

An airplane is driven by several turbojet engines each housed in a nacelle also harboring an assembly of ancillary actuation devices related to its operation and providing various functions when the turbojet engine is operating or is at a standstill, such as for example a thrust reversal system.

A nacelle generally has a tubular structure comprising an air intake upstream from the turbojet engine, a middle section intended to surround a fan of the turbojet engine, a downstream section intended to surround the combustion chamber of the turbojet engine and if necessary harboring the thrust reversal means, and generally ends with an ejection nozzle, the outlet of which is located downstream from the turbojet engine.

Modern nacelles are intended to harbor a double flow turbojet engine capable of regenerating, via the blades of the rotating fan, a hot air flow (also called primary flow) stemming from the combustion chamber of the turbojet engine, and a cold air flow (secondary flow) which circulates outside the turbojet engine through a ring-shaped passage, also called vein, formed between a fairing of the turbine engine and an internal wall of the nacelle. Both air flows are ejected from the turbojet engine through the rear of the nacelle.

The role of a thrust reverser is, during the landing of an airplane, of improving the braking capacity of the latter by redirecting forwards at least one portion of the thrust generated by the turbojet engine. In this phase, the reverser blocks the vein of the cold flow and directs the latter towards the front of the nacelle, consequently generating a counter-thrust which will be added to the braking of the wheels of the airplane.

The means applied for achieving this reorientation of the cold flow vary depending on the type of reverser. However, in all the cases, the structure of a reverser comprises moveable cowls which may be displaced between a deployed position in which they open in the nacelle a passage for the deflected flow on the one hand, and a retracted position on the other hand in which they close this passage. These cowls may fulfill a deflection function (reverser with pivoting doors) or simply for actuating other deflection means.

In the case of a reverser with grids, also known as a cascade reverser, the reorientation of the air flow is carried out by deflection grids, the cowl only having a simple sliding function aiming at uncovering or covering these grids. Additional blocking doors also called foil flaps, activated by the sliding of the cowling, also allow closing of the vein downstream from the grid so as to optimize the reorientation of the cold flow.

In order to support the moveable reversion cowls and to bind the downstream section to the remainder of the nacelle and notably to the middle section via the fan case, the downstream section comprises fixed elements and notably longitudinal beams bound upstream to a substantially ring shaped assembly called a front frame, formed with one or several portions between said longitudinal beams, and intended to be attached to the periphery of the downstream edge of the case of the fan of the engines.

In the case of a grid reverser with translationally moveable cowls, the supporting fixed element will typically comprise two upper longitudinal beams said to be at 12 o'clock, positioned on either side of a nacelle attachment pylon or of a pylon type interface, and two lower longitudinal beams said to be at 6 o'clock.

These beams are also used as a support for translation guiding rails of the moveable cowls.

The front frame is then formed with two substantially hemicylindrical half frames binding the upper and lower beams together on either side of a longitudinal axis of the nacelle.

In the case of a thrust reverser of the cascade or grid type, this front frame is also used for supporting the assembly of deflection grids positioned between said beams.

In the thrust reversal position, the deflected air flows through the deflection grids from the circulation veins between the front frame and an upstream edge of the moveable cowl having moved backwards.

Thus, in order to maximize the thrust reversal performances, the front frame should have an aerodynamic profile promoting laminar flow of the deflected stream and generate as few as possible aerodynamic accidents on the flow path of the deflected air. This is why, it has a curved profile, at least in the proximity of the circulation vein of the airflow its deflection initiation. This curve portion is called a deflection edge.

Certain line accidents in a forward thrust mode cannot be suppressed and therefore have to be minimized.

A first line accident exists because of the mounting of the front frame on the fan case. In addition to difficulties in perfectly aligning the front frame and the case at the interior of the vein, it should be noted that in order to avoid scooping of the air by the front frame, an upstream edge of the interface between the front frame and the case should be radiant outwards.

In fact, the result thereof is necessarily the presence of a cavity, forming an aerodynamic accident in the vein.

In the same way, there also necessarily exists functional play between this front frame and the blocking foil flaps which, in the closing position have to come and restore at best the inner aerodynamic continuity of the vein. In order to avoid any scooping, a downstream edge of the blocking foil flaps is also curved towards the outside of the nacelle, thereby creating a second cavity.

However it should be noted that the foil flaps are moveable around a downstream pivot axis and that the interface for mounting the foil flaps is not sealed. Therefore there will necessarily exist minimum scooping through the cavities for housing the blocking foil flaps.

Thus, in non-reversed flow, said to be a direct flow, the air flow encounters at least two line accidents, respectively at an interface between the front frame and the fan case, and at an outcrop between the front frame and the blocking flaps.

In the thrust reversal position, the deflected stream remains perturbed by the first cavity which, by perturbing the flow of the air stream, causes a slight delay in the deflection of the airflow which no longer perfectly adheres to the deflection edge of the front frame.

It is therefore understood that both of these performances in forward thrust mode and in reversed thrust mode may be impacted by these aerodynamic accidents.

A first solution for simply addressing this problem is to raise a lower portion of the front frame so as to generate a pocket for receiving therein the upstream portion of the blocking foil flaps.

This solution is notably described in document U.S. Pat. No. 4,185,798.

A limitation of such a solution however lies in the fact that in the thrust reversal mode, the air stream tends to pursue its direct path and not re adhere to the deflection edge, which substantially reduces the efficiency of the thrust reversal device.

SUMMARY

The present disclosure aims at a thrust reversal device for a turbojet engine nacelle comprising deflection means on the one hand, and at least one cowl moveable relatively to at least one fixed structure including at least one at least partly peripheral front frame and equipped with connecting means to a closing position in which it ensures the aerodynamic continuity of the nacelle and deactivates the deflection means and an open position in which it openly passes in the nacelle and activates the deflection means, on the other hand, the thrust reversal device being characterized in that the front frame has a deflection edge comprising an upstream extension forming a deformable flap intended to become an aerodynamic interface with the corresponding upstream portion to which is attached the front frame, and in that one portion of the moveable cowl is conformed so as to become in the closing position an interface with said upstream attachment portion by forcing withdrawal of the deformable flap.

Thus by providing a deformable interface flap, the latter may adopt a different configuration depending on the configurations of thrust reversal and of pressure in the vein of the turbojet engine.

In the forward thrust position, i.e. in the closed position of the thrust reverser, a portion of the moveable cowl is extended upstream so as to become an interface at the upstream attachment portion. Consequently and similarly to document U.S. Pat. No. 4,185,798, there only exists any more a single interface area instead of two as earlier.

The present disclosure, by the presence of the deformable flap, gives the possibility of again forming the running aerodynamic structure in the thrust reversal mode. More specifically, in the thrust reversal position, the deformable flap is no longer forced to withdraw and return to the working position in which it ensures aerodynamic continuity of the deflection edge with the upstream attachment portion.

In one form, the upstream attachment portion of the front frame is a fan case.

In another form, the means for connecting the front frame to the upstream attachment portion are of the knife/groove type.

According to another form of the present disclosure, the thrust reversal device is a thrust reverser with deflection grids, the moveable cowls being translationally moveable along a substantially longitudinal axis of the nacelle, covering and uncovering the grids in the closing and opening positions respectively.

In one form, the deflection grids are mounted on the front frame.

Advantageously, the portion of the moveable cowls conformed so as to force the deformable flap is a blocking foil flap, notably pivotally mounted through an upstream end on the moveable cowl.

Alternatively, this may be a dedicated upstream protrusion of the moveable cowl.

In an advantageous way, the deformable flap is sector-based.

According to a first alternative form, the deformable flap is made from at least one elastomeric material. Still, the deformable flap in one form comprises a lamellar core, optionally covered with a flexible coating.

According to a second alternative form, the deformable flap appears as a pivoting foil flap mounted against a means for elastically returning it to its interface position in a forward thrust mode.

In an advantageously additional way, the thrust reversal device comprises an abutment means limiting the return of the flap to its interface position in a forward thrust mode. This abutment thereby ensures improved positioning of the flap in its active configuration.

Advantageously, this abutment may be adjustable, discrete and located on the upstream attachment portion.

Further areas of applicability will become apparent from the description provided herein. It should be understood that the description and specific examples are intended for purposes of illustration only and are not intended to limit the scope of the present disclosure.

DRAWINGS

The present disclosure will be better understood in the light of the detailed description which follows with reference to the appended drawing wherein.

Figure 1:
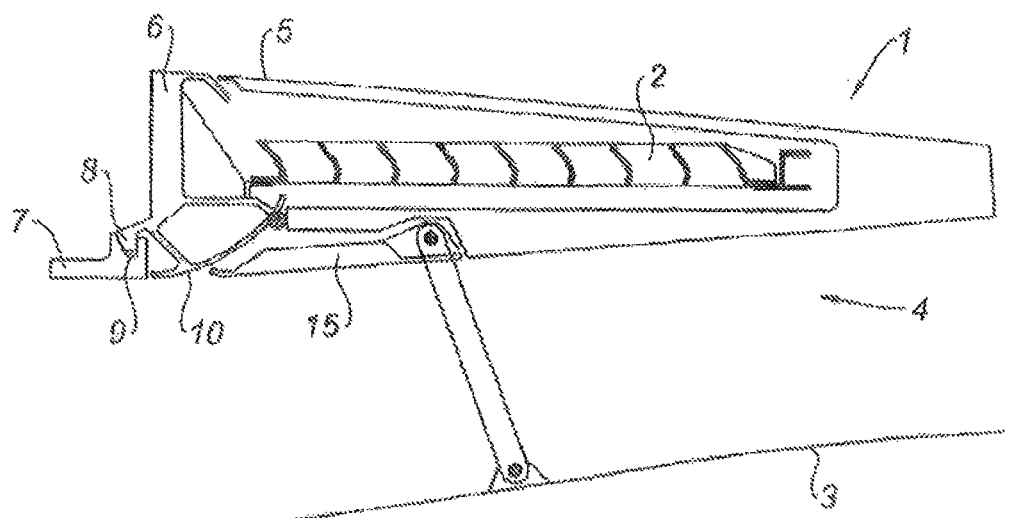
FIG. 1 is a schematic longitudinal sectional illustration of a thrust reversal device according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A thrust reversal device 1 with deflection grids 2 is schematically illustrated as a longitudinal sectional view in FIG. 1.

Such a thrust reversal device 1 equips a rear section of a nacelle surrounding a turbojet engine (not visible) and defines with the fixed internal fairing structure 3 of a rear portion of the turbojet engine, a vein 4 for circulating a so-called secondary air stream generated by the turbojet engine.

The thrust reversal device 1 comprises a moveable cowl 5 mounted so as to be translationally moveable along a substantially longitudinal axis of the nacelle between an opening position in which the moveable cowl 5 has moved backwards, opens the passage in the nacelle and uncovers deflection grids 2 and a closing position in which it ensures continuity of the nacelle and covers the deflection grids 2.

The moveable cowl 5 is moveable relatively to a fixed structure, comprising supporting and guiding beams (not visible), on the one hand, and a front frame 6 on the other hand, said front frame 6 may optionally be made in several portions, and notably in two hemicylindrical half portions.

The front frame 6 ensures attachment of the thrust reversal device 1 to an upstream structure of a nacelle, in this case a case 7 surrounding a fan of the turbojet engine via an at least partly peripheral knife 8/groove 9 type connection.

The front frame 6 also ensures that the deflection grids 2 are supported.

In order to ensure proper guiding of the air flow in the thrust reversal mode, the front frame 6 is equipped with a deflection edge 10 coming in continuity with the case 7 and defining a curvature towards the outside of the nacelle.

According to the present disclosure, the deflection edge 10 has an upstream extension forming a deformable flap intended to become an aerodynamic interface with the case 7 to which is attached the front frame 6.

Further, a portion of the moveable cowl 5 is conformed so as to become in the closing position an interface with said upstream attachment portion by forcing withdrawal of the deformable flap.

Exemplary forms are illustrated in FIGS. 2 to 8.

Figure 2:
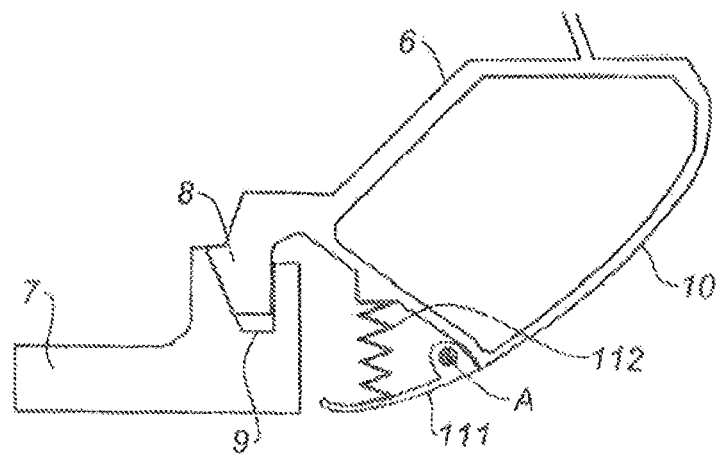
FIG. 2 is a schematic partial sectional illustration of the device of FIG. 1 equipped with a deformable flap according to a first form.

FIG. 2 shows a deformable flap made in the form of a foil flap 111 pivotally mounted around a transverse axis A and forced into an aerodynamic continuity position with the case 7 by a spring 112. The flap may be made in the form of a plurality of sector based peripheral flaps 111.

Figure 3:
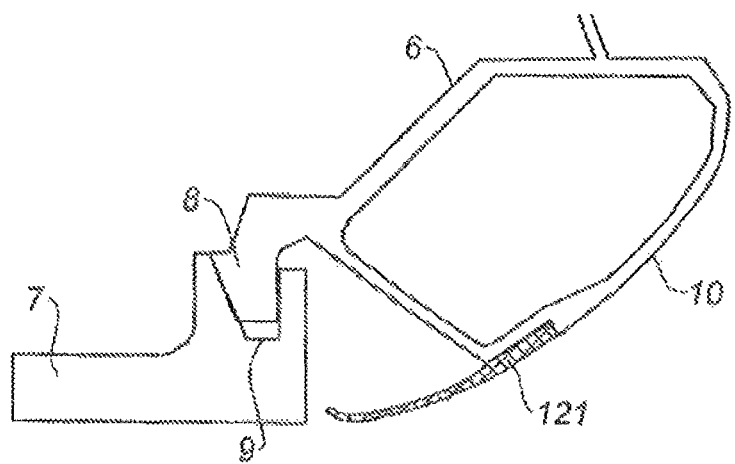
FIG. 3 is a schematic partial sectional illustration of the device of FIG. 1 equipped with a deformable flap according to a second form.

FIG. 3 shows a deformable flap made in the form of a tab 121 made from an elastomeric material and notably attached by bonding in the upstream extension of the deflection edge 10. The tab 121 may be made from a flexible lamellar core covered with a flexible coating allowing deviations in the positioning of the lamellas relative to each other. The flap may also be sector based.

Figure 4:
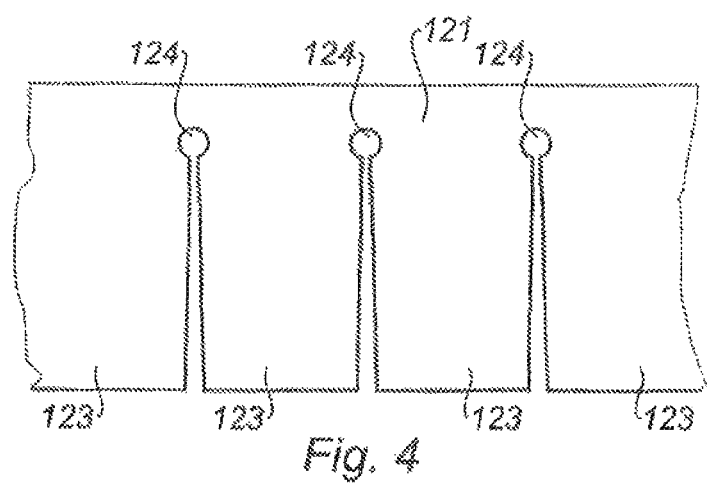
FIG. 4 is a schematic illustration of a sector-based example of the flap of FIG. 3.

The structure of the flap may also be very simple and as illustrated in FIG. 4, this flap may be made by a lamellar arrangement 123 and have cut-outs 124 which in the retracted position will be in contact or close, and provide a lumen in the reversal position.

Figure 5:
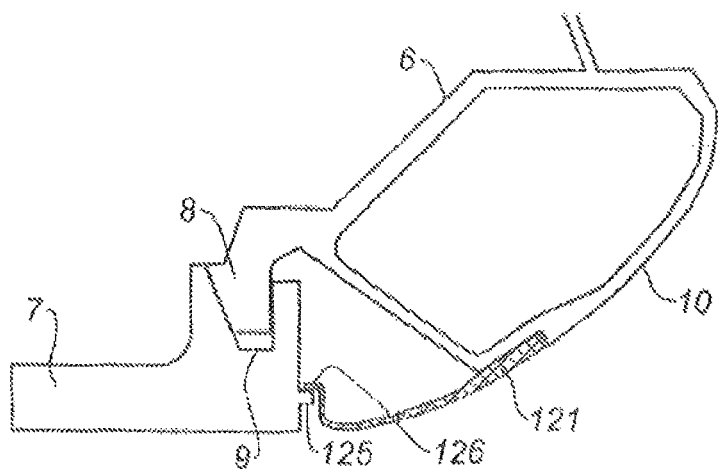
FIGS. 5 and 6 are exemplary embodiments of the invention with association of an abutment with the flexible flap, the abutment being respectively located on a front frame and on the moveable cowl.
Figure 6:
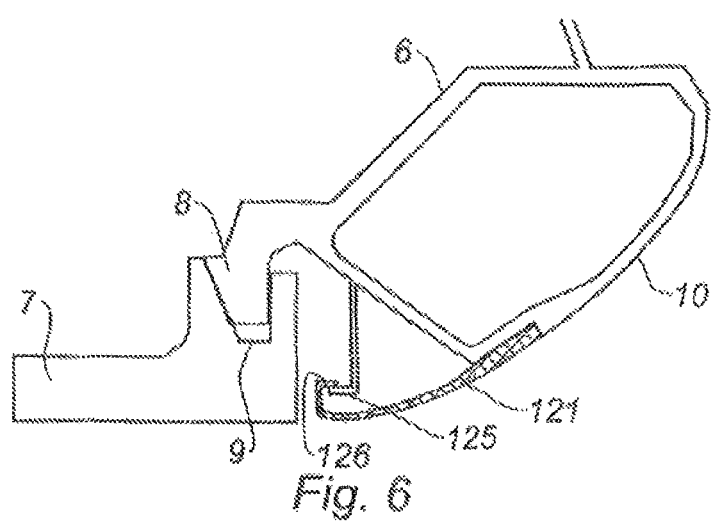

Advantageously, and as illustrated in FIGS. 5 and 6, the flexible tab 121 may be associated with a retaining abutment 125 in the interface position with the case 7.

In FIG. 5, this abutment 125 is located on a peripheral edge of the case 7 and cooperates with an edge 126 corresponding to the tab 121.

The same applies for FIG. 6 except for the difference that the abutment 125 is mounted on the front frame 6.

Of course, an abutment means may also be provided for the flaps made as pivoting foil flaps 111 of FIG. 2.

In an advantageously additional way, the abutment 125 may be adjustable and discrete.

According to the present disclosure, in the closing position, an upstream portion of the thrust reversal device 1 will force the deformable flap into the withdrawal position and ensure at its place the aerodynamic interface with the case 7.

Starting from the thrust reversal device 1 according to the prior art illustrated in FIG. 1, this upstream portion may be a blocking foil flap 15 pivotally mounted through an upstream end on the moveable cowl 5.

Figure 7:
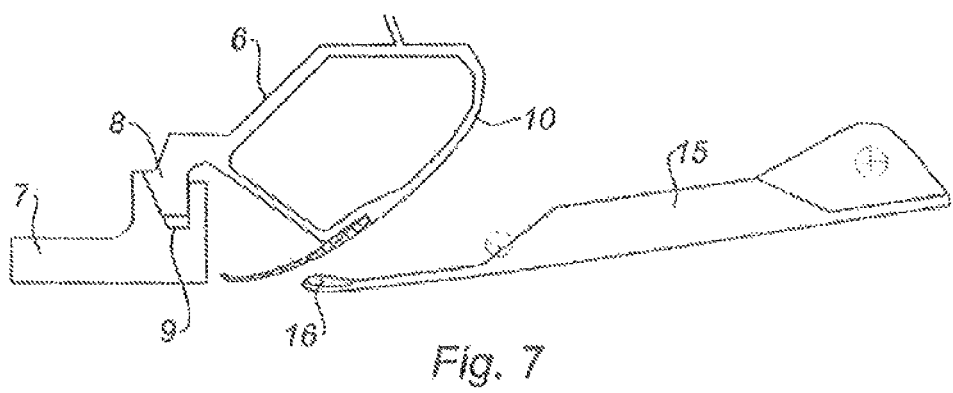
FIG. 7 is a schematic partial illustration in which the thrust reversal device comprises a blocking foil flap interfacing with the flap.

As visible in FIG. 7, this blocking foil flap 15 will be slightly extended upstream so as to interface with the case 7 in the place of the deformable flap.

In order to improve the maneuvering of the contacting elements and to ensure their durability, a sliding ramp 16 may be applied, notably on an internal end of the foil flap 15.

Figure 8:
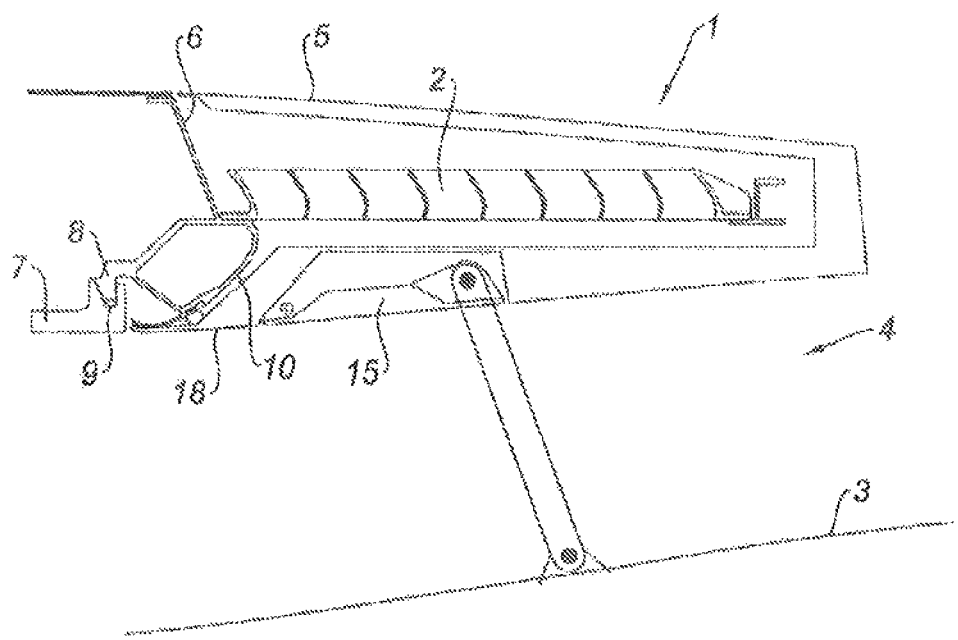
FIG. 8 is a schematic longitudinal sectional illustration of an alternative embodiment wherein the upstream interface structure is a protrusion of the moveable cowl.

FIG. 8 shows a second embodiment in which the upstream portion which will force the deformable flap into the withdrawal position and ensure in its place the aerodynamic interface with the case 7, is a fixed protrusion 18 of the moveable cowl 5, the blocking flap remaining at the rear downstream from the upstream edge of the moveable cowl 5.

This technology may also be applied for a reverser with grids without any flap, the reversal being allowed by the internal lines of the S-shaped secondary channel and which are blocked by the simple backward movements of the movable structure (a reverser also designated as a "blockerless" reverser).

Although the invention has been described with a particular exemplary embodiment, it is quite obvious that it is by no means limited thereto and that it comprises all the technical equivalents of the described means, as well as their combinations if the latter enter the scope of the invention.

What is claimed is:

1. A thrust reversal device for a turbojet engine nacelle comprising deflection grids and at least one cowl moveable relatively to at least one fixed structure including at least one at least partly peripheral front frame and equipped with means for connecting to a corresponding upstream portion, said at least one cowl being moveably mounted between a closing position in which the at least one cowl provides aerodynamic continuity of the turbojet engine nacelle and deactivates the deflection grids, an opening position in which the at least one cowl opens a passage in the turbojet engine nacelle and actuates the deflection grids, wherein the front frame has a deflection edge comprising an upstream extension forming a deformable flap to become an aerodynamic interface with the corresponding upstream portion to which is attached the front frame, and in that a portion of the at least one cowl is conformed so as to, in the closing position, interface with the corresponding upstream portion by forcing withdrawal of the deformable flap.

2. The thrust reversal device according to claim 1, wherein the corresponding upstream portion of the front frame is a fan case.

3. The thrust reversal device according to claim 1, wherein the means for connecting the front frame to the corresponding upstream portion are of a knife/groove type.

4. The thrust reversal device according to claim 1, wherein the at least one cowl is translationally moveable along a substantially longitudinal axis of the turbojet engine nacelle, covering and uncovering the deflection grids in the closing and opening positions respectively.

5. The thrust reversal device according to claim 4, wherein the deflection grids are mounted on the front frame.

6. The thrust reversal device according to claim 1, wherein a portion of the at least one cowl conformed so as to force the deformable flap, is a blocking foil flap, notably pivotally mounted through an upstream end of the at least one cowl.

7. The thrust reversal device according to claim 1, wherein the deformable flap is sector based.

8. The thrust reversal device according to claim 1, wherein the deformable flap is made from at least one elastomeric material.

9. The thrust reversal device according to claim 8, wherein the deformable flap comprises a lamellar core.

10. The thrust reversal device according to claim 9, wherein the lamellar core is covered with a flexible coating.

11. The thrust reversal device according to claim 1, wherein the deformable flap appears as a pivoting foil flap mounted against a spring returning the deformable flap towards the deformable flap's interface position in a forward thrust mode.

12. The thrust reversal device according to claim 1, wherein the thrust reversal device comprises an abutment limiting a return of the deformable flap towards the deformable flap's interface position in a forward thrust mode.

* * * * *